May 13, 1969  F. A. HANI  3,443,356

DEVICE FOR THE PRODUCTION OF PACKAGES

Filed May 25, 1966

*Inventor:*
FRANZ ALOIS HANI
BY *Rupert J. Brady*
ATTORNEY

United States Patent Office 3,443,356
Patented May 13, 1969

3,443,356
DEVICE FOR THE PRODUCTION OF PACKAGES
Franz Alois Hani, Rutlistrasse 6, Wil, Saint Gall,
Switzerland
Filed May 25, 1966, Ser. No. 552,802
Claims priority, application Switzerland, May 26, 1965,
7,399/65
Int. Cl. B65b 9/02, 7/02, 51/30
U.S. Cl. 53—184                                              4 Claims

ABSTRACT OF THE DISCLOSURE

Apparatus for forming a thermoplastic package having at least one welded seam about an object from two webs of thermoplastic foil overlying a pair of spaced opposed die plates having recesses therein and open grooves spaced from the recesses corresponding in configuration with the welded seam to be produced. Air nozzles are connected in communication with the open grooves of each die plate and are connected through valving to the vacuum side of a pump to maintain the two webs in position on the die plates and stretch the webs over an object laid between them in the area of the recesses as a device moves the die plates together to firmly press the two thermoplastic foil webs together on opposite sides of the open grooves. The valving is then movable to connect a hot air blower on the pressure side of the pump to the air nozzles and groove of one die plate while the groove of the opposite die plate is connected to the vacuum side of the pump to weld a seam in the webs in the area of the grooves and simultaneously separate the package thus formed from the remainder of the webs. Other air passages are also provided in the recesses to hold the foils therein, separate them therefrom and shrink the thermoplastic package taut about the article.

---

This invention relates to apparatus for the production of packaging from thermoplastic foil, which packaging has at least one welded seam, the packaging produced according to the process of making the same, and the application of the process to mechanical packaging.

An object of the invention is to produce economically with a simple apparatus, packaging incorporating at least one welded seam from thermoplastic foil even when the seam has a complicated shape, both independently of the packing procedure and also in combination with it, i.e. when the packaging is formed about the object to be packed. A particular object of the invention is to produce a foldless packaging generally conforming to the shape of the object that is packaged, even for objects of relatively complex shape, for example chocolate Easter hares, for which end the apparatus to be used can be matched at low cost to the shape of the object to be packed.

In the process according to the invention the two thermoplastic foils laid upon one another and to be welded together, are pressed against each other, by die plates at each side of the seam to be produced and are covered and thereupon at least one hot air stream is directed upon the seam to be produced through a groove in the die plates, in order to weld the foils together and simultaneously to separate the parts lying on opposite sides of the seam.

If the object to be packed is laid between the foils before they are welded together and separated, in order to form the packaging about the object, then expediently each of the foils is initially held by suction along a groove in the die plates corresponding to the seam to be produced in such a way that the foil can slide at the suction point without being disengaged from it to thus hold the foils taut. The object is then inserted into place, the suction points on the two foils are covered over and in place of the suction in the groove of one die plate a hot air stream is brought into action.

Apparatus according to the invention for carrying out the process according to the invention, includes two pairs of members, each pair of which defines a running clearance groove corresponding to the seam to be produced, and a means of pressing one of these pairs of members onto one side of a pair of foil webs disposed between the two pairs of members, and the other pair of members in opposition to the first pair onto the opposite side of the foils and at least one hot air supply connected to the clearance groove of one of these pairs of members.

In one embodiment of this apparatus, with which the production of the packaging and the packing of objects is carried out in a single working process, each pair of members is formed by the lips of a slotted nozzle, and the slotted nozzles are separable to allow the goods to be inserted between them and movable to press the foils together, and selectively both slotted nozzles can be connected to an air suction conduit or one slotted nozzle can be connected to a hot air nozzle while the other is connected to the air suction conduit.

In the accompanying drawing the important parts in relation to the foregoing are illustrated in one embodiment of apparatus according to the invention. In relation to a process according to the invention is also described, packaging produced according to the process and the application of the process to mechanical packing, by way of example. The drawing shows apparatus for the production of an enclosing packaging from thermoplastic foil for one of the articles to be packed, in the case of the example a chocolate Easter hare.

Figure 1:
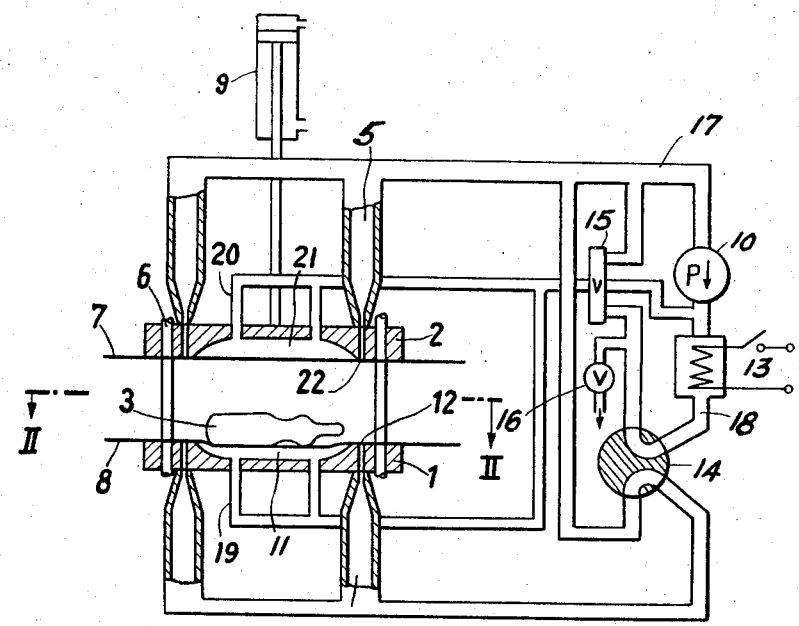
FIG. 1 is a vertical section view of the apparatus of the invention with portions shown schematically.
Figure 2:
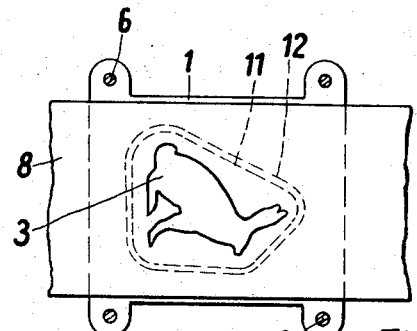
FIG. 2 is a horizontal section view taken substantially on the line II—II in FIG. 1.

The thermoplastic material packaging apparatus illustrated has a fixed plate 1 with a recessed trough 11, the depth and base area of which are matched to a symmetrical half of the chocolate hare 3, for which the packaging is to be produced. Spaced about the edge of the trough 11 runs a clearance groove 12 which is in communication with the lips of a slotted nozzle 4. A plate 2, which is a mirror image of the plate 1, also has a recessed trough 21 therein and a clearance groove 22 spaced about the edge of recess 21 which is in communication with the lips of a slotted nozzle 5, and is movable relative to plate 1 on guide bolts 6. In the raised position of the plate 2, illustrated in FIG. 1, there is a gap between the plates 1 and 2 which makes it possible to lay the chocolate hare 3 between the plates 1 and 2. The plate 2 is connected to a moving device 9, which makes it possible to move the plate 2 towards the plate 1, to exert a pressure in this direction upon the plate 2, and to withdraw the plate 2 into the position illustrated, remote from the plate 1.

Figure 3:
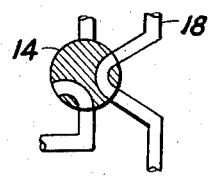
FIG. 3 is a schematic view of a fragmentary portion of FIG. 1 showing the valve in a different position to connect suction to the groove of one die plate and hot air pressure to the groove of the opposite die plate.

The apparatus also includes an air pump 10 and a hot air blower 13 as well as valves 14, 15 and 16 which make it possible to connect either the nozzles 4 and 5 simultaneously to the suction conduct 17 of the air pump 10, as shown by the position of valve 14 in FIG. 1, or makes it possible to connect the nozzle 4 to the hot air conduit 18 of the blower, FIG. 3, and leave nozzle 5 connected to the suction conduit 17. The apparatus also has guide-rollers which are arranged outside the interspace between the plates 1 and 2 and function to guide a web or foil 7 of thermoplastic material across the underside of the plate 2 and a similar web or foil 8 of thermoplastic material across the upper side of the plate 1. The guide rollers are not illustrated in the drawing. The negative pressure in the suction conduit 17 of the pump is so adjusted (for example by means of a bleed valve) that under the effect of the negative pressure, the foils 7 and 8 so firmly adhere to the clearance grooves 22 and 12 that they can slide at these points without, however, detaching from the limits of the clearance grooves. That is the webs or foils always cover the grooves.

With the apparatus described, the packaging procedure is as follows:

In the position of plate 2 shown in FIG. 1 the nozzles 4 and 5 are connected by valve 14 to the suction conduit 17 of the pump 10, so that the foils 7 and 8 are held on the plates 1 and 2 by the suction of grooves 12 and 22. The chocolate hare 3, about which a thermoplastic packaging is to be formed from the foils 7 and 8, is laid on the foil 8 over the trough 11 and, to the extent necessary for its secure positioning, is lightly pressed downwards, whereby the foil 8 is arched downwards into the trough 11 and the foil adjacent the trough thus slides over the clearance groove 12 but not far enough to uncover it. The plate 2 is thereupon moved in the direction of the plate 1 by device 9. Thereby the upper foil 7 arches upwards and the lower foil 8 arches downward, into the respective recesses and in so doing the foil 7 slides on the clearance groove 22 and the foil 8 slides on the clearance groove 12, but they can form no folds, since as a result of the setting of the suction negative pressure they cannot detach from the clearance grooves which hold the foils taut. In addition, the interspace between the plates 1 and 2 is steadily reducing, which likewise prevents folding. After the plates 1 and 2 are moved together and the foils 7 and 8 are lying on one another outside or around the periphery the recessed troughs 11 and 21, a further pressure is exerted on the plate 2 by device 9 in order to press the foils together and so hold them firmly. Thereupon the nozzles 4 and 5 are separated from the suction air line and the nozzle 4 is connected to the hot air conduit 18 by rotation of valve 14 to the position shown in FIG. 3, which leaves nozzle 5 connected to the suction air line. The hot air stream causes the thermoplastic material of the foils 7 and 8 to melt in the region of the clearance grooves 12 and 22, so that at these points the foils 7 and 8 are welded together and in addition the parts of the foils which form the package enclosing the hare 3 are separated from the surrounding parts of the webs or foils. The hot air is thereupon shut off, the plate 2 withdrawn to the position illustrated in FIG. 1 by moving device 9, remote from the plate 1 and the packaged hare 3 can then be removed from the apparatus. If it is desired the completed package can now be briefly heated in order to shrink the foil so that the hare is tightly enclosed.

In the example described, the plates 1 and 2 serve both to press the foils together and to cover both sides of the welded seam being produced and also to direct the hot air stream onto the zones not covered. It is however also possible to use separate means for the pressing together and covering of the foils on both sides of the welded seam being produced and for the direction of the hot air stream upon them, for example a hot air nozzle may be moved along the groove, particularly if it is possible to dispense with the described suction of the foils. In a reversal of the motion, the nozzle can be fixed and the foil moved, for example between slip shoes which reduce the clearance.

The plates 1 and 2, for example, may be conveniently made from Teflon, since the foils do not stick to this material.

The plates 1 and 2 can have channels or pores 19 and 20 opening into the recessed troughs 11 and 21, respectively, and three channels or pores connected to pump 10 through valve 15 make it possible to suck the foils 7 and 8 onto the face walls of the troughs and thus shape the foils in the troughs before the chocolate hare 3 is inserted into place, or this can be done during the process of bringing the plates 1 and 2 together. If this shaping or forming process is carried out before the chocolate hare 3 in inserted, it can be assisted by heating the foil, hot air being blow onto the foils by means of a hot air douche in a distribution pattern conformable to the location of the foil extensions. It is further possible after the welding together of the foils to introduce warm air from hot air blower 13 through the channels or pores 19 and 20 by means of valve 15 with the plates 1 and 2 slightly separated, in order to shrink the thermoplastic foil casing thus formed tightly about the chocolate hare that it encloses. It is also possible after the welding together of the foils to direct compressed air through the channels or pores 19 and 20, by manipulation of valve 15, in order to simplify the detachment of the foils from the troughs 11 and 21 and the removal of the packed chocolate hare from the lower trough. A movable ram (not shown) displaceable in a bore in the bottom of the trough 11 can also serve for the latter purpose.

The hot air stream functioning for the welding together of the foils and simultaneous separation of the parts of the foils on opposite sides of the welded seam is preferably directed in a continuous circuit. In this way a smaller hot air blower is adequate, since the energy required for the heating of the air is better utilized and the separation process is assisted by the fact that not only does a positive pressure prevail on one side of the foil, but there is a negative pressure on the other side of the foil, as indicated by the valve position in FIG. 3.

sure on the other side.

The apparatus preferably forms a part of a fully- or semi-automatic packing machine.

It is also possible according to the described process and with the described apparatus for objects to be packed at the same time and be separated from one another by one or more foils. For example a foil may be introduced between the foils 7 and 8 of the example described and one object inserted above and another below this foil.

I claim.

1. Apparatus for producing packaging with at least one welded seam around an article from a web of thermoplastic foil, comprising a first pair of members having a face portion, a second pair of members having a face portion positioned opposite the face portion of said first pair of members, an open groove in the face portion of each of said first and second pairs of members corresponding in configuration with the welded seams to be produced in a first web of thermoplastic foil adapted to overlie the face portion and groove of said first pair of members and a second web of thermoplastic foil adapted to overlie the face portion and groove of said second pair of members, at least one slotted hot-air nozzle having opposed lip members, one of said pairs of members formed in part by said opposed lip members of said slotted hot-air nozzle connected in communication with said open groove in the face portion thereof, means connected to move said first pair of members against said second pair of members to press said first and second webs of thermoplastic foil together between the respective face portions, and hot-air supply means connected to said slotted hot-air nozzle to supply hot-air to the corresponding open groove, whereby the first and second webs of thermoplastic foil on opposite sides of an article are welded on a seam surrounding the article corresponding to the registered open grooves in said face portions.

2. Apparatus as set forth in claim 1 including a second slotted air nozzle having opposed lip members connected in communication with the open groove in the face portion of and partly forming the other of said pairs of members, said hot-air supply means including an air suction conduit means and a hot-air conduit means, means connected to said air suction conduit means and said hot-air conduit means for selectively connecting both said slotted hot-air nozzle and said second slotted air nozzle to said air suction conduit means, and for connecting said slotted hot-air nozzle to said hot-air conduit means and said second slotted air nozzle to said air suction conduit means for welding and severing the packaging seam from the first and second webs of thermoplastic foil.

3. Apparatus for producing packaging with at least one welded seam around an article from a web of thermoplastic foil, comprising a first plate member having a face portion with a recessed cavity, a second plate member spaced from said first plate member and having a face portion with a recessed cavity positioned opposite the face portion of said first plate member, each of said plate members having an open endless groove in the face portion thereof spaced from the edge of said recessed cavity whereby first and second webs of thermoplastic foil are adapted to overlie said plate members and said respective grooves, means connected to move said plate members between one position in which the plate members are spaced apart to introduce said first and second webs of thermoplastic foil between the plate members and on opposite sides of an article to be packaged and a second position in which said open endless grooves and said recessed cavities of said plate members are moved into registration with each other whereby said recessed cavities form a space for the article being packaged, first and second air nozzle means connected in communication with said open endless grooves in said first and second plate members respectively, air suction conduit means, air pressure conduit means, hot-air conduit means, said first air nozzle means connected to said air suction conduit means, first valve means connected to selectively connect said second air nozzle means to said air suction conduit means or said hot-air conduit means, air channel means connected in communication with said recessed cavities of said first and second plate members, and second valve means connected to selectively connect said air channel means to said air suction conduit means, said air pressure conduit means and said hot-air conduit means.

4. Apparatus as set forth in claim 3 including pump means connected to said air suction conduit means and said hot-air conduit means, and a continuous air circuit means from the open endless groove of said second plate members to said open endless groove of said first plate member through said first air nozzle means, said air suction conduit means, pump means, hot-air conduit means, first valve means and said second air nozzle means when said second air nozzle is connected by said first valve means to said hot-air conduit means, whereby suction is exerted on one side of the webs of thermoplastic foil while hot-air pressure is exerted on the opposite side thereby.

References Cited

UNITED STATES PATENTS 2,590,379  3/1952  Cloud.
3,029,007  4/1962  Hepner.
3,340,678  9/1967  Rhodes _____ 53—372

THERON E. CONDON, *Primary Examiner.*

C. F. DESMOND, *Assistant Examiner.*

U.S. Cl. X.R.

53—182, 372